United States Patent Office 3,504,033
Patented Mar. 31, 1970

3,504,033
PROCESS FOR PREPARING N-TERTIARY-ALKYLANILINES AND THEIR HYDRO-HALIDE SALTS
David Edgar Ailman, Pennington, N.J., assignor to American Cyanamid Company, Stamford, Conn., a corporation of Maine
No Drawing. Filed Sept. 8, 1967, Ser. No. 666,489
Int. Cl. C07c 85/06; A01n 9/20
U.S. Cl. 260—577
6 Claims

ABSTRACT OF THE DISCLOSURE

N-tertiary alkylated aniline compounds and their corresponding acid salts are prepared by reacting one mole of an aniline acid salt of the formula:

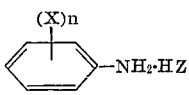

where X may be lower alkyl, chloro or bromo, ($n=0$–2) and where HZ is a hydrohalogen acid, with 1 to 1.5 moles of a tri-lower alkyl carbinol in the presence of at least about 1 mole of the aniline oil corresponding to the above acid salt at 120–220° C.

---

The invention relates to an improved process for preparing N-tertiary alkylated aniline compounds of the formula

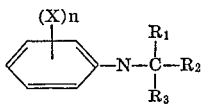

and acid salts thereof, where X is lower alkyl, bromo, or chloro; $R_1$, $R_2$ and $R_3$ are each lower alkyl; and is an integer from 0 to 2. It further relates to a method for controlling undesirable plants by the use of this aniline compound and to an herbicidally active composition containing the compound.

It is known from U.S. Patent 2,692,287 that N-tertiary alkylated aromatic secondary monoamines can be prepared by reacting one mole of a carbocyclic aromatic primary amine with from 1 to 30 moles of a saturated tertiary alkyl alcohol containing from 4 to 8 carbon atoms in the presence of certain acid catalysts. This process gives product yields of from 2 to 62.2% depending on the nature and amount of the catalyst, reactants, and other variables.

However, there are three principal disadvantages to this prior art process.

(1) Under the conditions of the reaction there is excessive decomposition of the reactant tertiary alkyl alcohol with the result that, although as little as one mole of alcohol per mole of reactant aromatic amine is operable, as a practical matter, large excesses of alcohol must be used to produce reasonable yields. Table 2 in U.S. 2,692,287 clearly illustrates this fact for the case of t-butylaniline wherein it is shown that when one mole to t-butyl alcohol was reacted with one mole of aniline, the yield was 20%, with the yield rising to only 27% when two moles of alcohol per mole of aniline were used. However, when 3.5 moles of alcohol per mole of aniline were used, the yield rose dramatically to 59.5%.

The present invention overcomes this problem and produces yields of t-butylaniline, for example, of up to 80% using only 1.0 to 1.5 moles of t-butyl alcohol per mole of aniline.

(2) Practice of the prior art process, as pointed out in column 3, lines 25–26 of U.S. 2,692,287, takes place at elevated pressures. I have found these pressures to be of the order of 400 p.s.i. or higher. The high pressures are generated by the gaseous decomposition product(s) of the tertiary alkyl alcohol used. For example at the reaction conditions of U.S. 2,692,287, t-butyl alcohol undergoes considerable decomposition to isobutylene resulting in the loss of up to 55% of the t-butyl alcohol charged. I have found that the practice of my invention greatly reduces these pressures and generally permits the reaction to be carried out at pressures of 100 p.s.i. or less.

(3) The reaction media of U.S. 2,692,287, is an extremely corrosive one due to the free acid which exists during the reaction. I have found the practice of the present invention to result in a substantial reduction in the corrosiveness of the reaction medium thereby permitting the reaction to be carried out in more conventional and less expensive equipment.

The greatest disadvantage of the prior art process is the resultant excessive decomposition of the reactant tertiary alkyl alcohol into gaseous decompostion products. This decomposiiton results in loss of reactant thereby requiring large excesses of reactant alcohol to achieve practical product yields. In addition, the gaseous decomposition products generate undesirable high pressures. I have found that the inclusion in the reaction mixture of at least about one mole of the corresponding aniline oil in excess of reactant aniline acid salt surprisingly, and for reasons not clear, significantly reduces the decomposition of the reactant tertiary alkyl alcohol. For example, when the teaching of U.S. 2,692,287 was followed using 5 moles of t-butyl alcohol per mole of aniline anywhere from 45 to 55% of the alcohol was lost as a result of decomposition to isobutylene whereas the practice of my invention, which utilizes only 1–1.5 mole of t-butyl alcohol per mole of reactant aniline generally results in alcohol decomposition losses in the range of 0–16%. While the aniline oil does not always totally eliminate the decomposition of the alcohol, it has minimized it to the point where the use of only 1–1.5 mole of alcohol per mole of reactant aniline salt of aniline produces product yields which are significantly higher (ca. 80% v. ca. 60% based on the aniline acid salt) than the prior art was capable of achieving with anywhere from 1 to 30 moles of alcohol per mole of aniline salt. Furthermore, by suppressing the decomposition of the alcohol, the reaction may be carried out at the relatively low pressure of 100 p.s.i.g. or less.

The improved yields which result from the practice of my invention suggest that they may be due to an effect which is independent of the reduced decomposition of alcohol, since U.S. 2,692,287 indicates, in the case of preparing tertiary butyl aniline at least, that even if 30 moles of t-butyl alcohol are used per mole of aniline, the product yield is only 61.7%. The presence of 30 moles of alcohol should provide sufficient excess reactant alcohol for one mole of aniline despite the high degree of decomposition to isobutylene so that low product yields could not be attributable to lack of available reactant alcohol. A comparison of the 30 moles of t-butyl alcohol with the 1.0–1.5 moles of t-butyl alcohol per mole of aniline of the present invention. (This is only 0.5 to 0.75 mole (or less) of the tertiary alcohol per mole of total aniline (oil+salt) present in the reaction mixture.) Provides an example wherein there is a sufficient stoichiometric quantity of alcohol available for reaction in both instances (with a shortage of alcohol existing, if anywhere, in the case of the 1.0–1.5 moles of alcohol) but wherein the yields are significantly different with the smaller amount of alcohol surprisingly, providing yields up to 18% higher than the larger amount of alcohol.

A further unexpected feature of this invention is the significant reduction in the corrosiveness of the reaction medium.

The products produced by this improved process are useful as preemergence and postemergence herbicides.

It is therefore an object of this invention to provide a process for preparing N-tertiary alkylated aniline compounds and acid salts thereof in greater yield.

A further object is to provide a process for preparing such compounds at a lower reaction pressure and in a less corrosive medium.

Another object is to provide a method and composition for controlling undesirable plant growth.

These and other objects of my invention will be apparent from the foregoing and subsequent description.

The N-tertiary alkylated amines are preferably prepared by reaction one mole of an acid salt of the appropriately substituted aniline compound of the formula

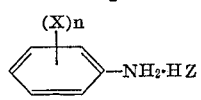

wherein X is selected from the group consisting of lower alkyl, bromo, chloro and where $n=0$ to 2 and where HZ is a hydrohalogen acid, with 1 to 1.5 moles of a trialkylcarbinol of the formula:

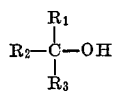

wherein $R_1$, $R_2$ and $R_3$ are each lower alkyl, in the presence of at least about 1 mole of the aniline oil corresponding to the aniline acid salt at temperatures of 120–220° C. In a preferred embodiment 1.2–1.5 moles of tri-alkyl carbinol, and 1 to 4 moles of the corresponding aniline oil are used at a temperature of about 150° C. More than 4 moles of the corresponding aniline oil may of course be used and such use is contemplated to fall within the scope of this invention. However, from the practical point of view of cost and the necessity of recovering the excess, minimal quantities are preferred.

The reaction can ordinarily be carried out at pressures of about 50–100 p.s.i.g. and under milder corrosive conditions than the prior art. Products are initially formed as the acid salt of the free base. The free base may be readily obtained by treating the acid salt with a suitable base such as sodium hydroxide or potassium carbonate. The salts may be prepared from the free alkyl aniline by treatment with a suitable acid such as anhydrous hydrogen chloride or hydrogen bromide, concentrated aqueous hydrochloric acid, methylsulfonic acid, toluene sulfonic acid, or other equivalent means, either in the presence or absence of an inert solvent such as for example, tetrahydrofuran, xylene, or chlorobenzene.

The acid functions as a catalyst for the reaction. In view of this, the invention is not limited to the use of an aniline acid salt compound as a necessary starting material. For example, instead of employing one mole of an aniline acid salt, two moles of the appropriate aniline compound and then one mole of an appropriate acid could be separately charged to the reaction mixture. The important feature of the invention is that, in addition to the one mole of aniline and the one mole of appropriate acid catalyst in any form, there must be included at least about one mole of the corresponding aniline oil in excess of the aniline acid salt present in the reaction mixture.

Products were regularly assayed by liberating the N-tertiary alkyl aniline oil from representative samples (reaction crudes or products) with 20% alkali and assaying the oil by gas-liquid chromatographic techniques. An Aerograph gas chromatograph, Model A–100–C, was equipped with a five foot Reoplex column and operated isothermally at an oven temperature of about 160° C., with injection port at 210° C. and with 10 p.s.i. Helium carrier gas.

Quantitation was achieved by observing the response to known mixtures of the two major components (N-tertiary alkyl aniline and aniline) and graphing the results to produce a correlation of gas-liquid chromatographic area with the weight percent N-tertiary-alkyl aniline in the mixture of aniline and N-tertiary-alkyl aniline.

The following examples are intended to further illustrate but not limit the invention.

EXAMPLE 1

Preparation of N-tertiary-butylaniline hydrochloride

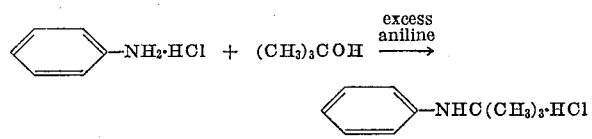

63.4 g. (0.490 mole) of aniline hydrochloride, 54.6 g. (0.736 mole) of tertiary-butyl alcohol, and 183.0 g. (1.96 mole) of aniline were charged, in the order names above, to a Fisher-Porter "Squibb-type" Pyrex glass aerosol bottle of 430 ml. volume used as a reactor and equipped with a bleed valve and a brass pressure gauge of 200 p.s.i. capacity. With 301.0 g. of total reactant, the apparatus was filled to about two-thirds of the total volume at room temperature. The reactants were mixed by bubbling nitrogen through the liquid prior to final assembly of the apparatus. The apparatus was then assembled with the bleed valve open and lowered into a silicone bath to a depth of about five inches—about the level of the reactants in the reactor. The temperature of the bath was kept at about 152° C. The mixture was allowed to warm until vapors began to reflux in the cool parts of the apparatus and then the bleed valve was closed. The reaction proceeded for seven hours at a temperature of about 152° C. During this time the highest pressure observed was 77 p.s.i. The reaction mixture was then cooled to room temperature. Residual pressure was released and the apparatus opened and weighed. The reaction mixture consisted of a purple liquid with about 10 g. of a crystalline material settled to the bottom. The mixture had lost about 3% in weight during the run. This probably consisted of t-butyl alcohol, isobutylene and moisture.

292 grams of the reaction mixture was recovered from which a 61 g. aliquot was taken for examination and assay. The aliquot was treated with 35 ml. of water plus 30 ml. of 20 sodium hydroxide solution. 55.7 grams of purple oil was separated which upon analysis by gas-liquid chromatographic techniques was found to contain 21 weight percent N-tertiarybutylaniline. This analysis corresponds to a 77% yield of N-tertiary-butylaniline based on aniline hydrochloride.

The remaining 229.5 g. was concentrated by distillation under reduced pressure to remove 113 g. of a mixture of water, t-butyl alcohol and an oil containing 1.9% N-tertiary-butyl aniline and 89.0% aniline. To the warm residue was added 300 ml. of toluene. A grainy precipitate formed immediately. The mixture was stirred while cooling to 25° C., filtered and the solid dried in a vacuum oven at 40° C. to give 62.6 g. of a light gray crystalline solid. Gas-liquid chromatographic assay of the oil layer from 1 g. of the solid in 3 ml. water plus 2 ml. of 20% NaOH showed only two components: N-tertiary butyl aniline (75%) and aniline (25%). These weight percents correspond to 72.7% N-tertiary-butyl aniline hydrochloride and 27.3% aniline hydrochloride which in turn correspond to a 63.5% isolated yield of N-tertiary-butyl aniline hydrochloride.

The crude N-tertiary-butyl aniline hydrochloride may be upgraded to very high purity by several techniques. For example, a product similar to the 72.7% crude above, but assaying 84% N-tertiary-butyl aniline hydrochloride was stirred with 200 ml. of acetone and 10 ml.

of water for a few minutes, filtered and dried. 76.0 g. (90.5% recovery) of white N-tertiary-butyl aniline hydrochloride was obtained with a melting point of 220–221° C. The oil liberated by alkali from a sample of this product contained only a trace of aniline impurity by gas-liquid chromatographic assay.

In a second method for producing high purity N-tertiary-butyl aniline hydrochloride, a mixture containing about 33 g. of aniline and 30 g. of N-tertiary-butyl aniline in about 50 ml. of toluene was mixed with 800 ml. of water and 54 g. (0.9 mole) of acetic acid. The toluene layer was removed and the aqueous layer was shaken vigorously with 90 g. (0.85 mole) of benzaldehyde. The benzalaniline which formed was removed with ether. The aqueous layer was made alkaline by the addition of 35 g. (0.87 mole) of sodium hydroxide in 200 ml. of water. The N-tertiary-butyl aniline was recovered with ether, dried azeotropically with toluene and distilled on a 6-inch vacuum-jacketed Vigreux column, collecting 21 g. (70% recovery) of product at 146–150° C. (130 mm.), $n_D^{25}$ 1.5244–1.5267, 99+ percent N-tertiary-butyl aniline by gas-liquid chromatographic assay.

EXAMPLES 2 TO 10

Various other N-tertiary alkylated aniline acid salt compounds may be prepared in a manner similar to that outlined in Example 1 except that the aniline and the aniline hydrochloride is replaced by the appropriately substituted aniline and its aniline acid salt and the t-butyl alcohol is replaced by the appropriate tri-lower alkylcarbinol. Table I below lists typical compounds which may be prepared in this manner and the appropriate reactants from which they may be prepared in accordance with the procedure of Example 1.

TABLE I

| Example Number | Reactants | | N-Tertiary Alkylated Aniline Acid Salt |
|---|---|---|---|
| | Aniline Acid Salt | Tri-Lower Alkyl Carbinol | |
| 2 | Br—⟨C₆H₄⟩—NH₂·HCl <br> p-bromoaniline hydrochloride | $(CH_3)_2\overset{C_2H_5}{\underset{|}{C}}OH$ <br> dimethylethylcarbinol | Br—⟨C₆H₄⟩—NHC(CH₃)₂C₂H₅·HCl <br> N-tertiary-amyl-p-bromoaniline hydrochloride |
| 3 | Cl—⟨C₆H₃(Cl)⟩—NH₂·HCl <br> p-chloro-o-chloroaniline hydrochloride | $(CH_3)_3COH$ <br> t-butyl alcohol | Cl—⟨C₆H₃(Cl)⟩—NHC(CH₃)₃·HCl <br> N-tertiary-butyl-o,p-dichloroaniline hydrochloride |
| 4 | C₂H₅—⟨C₆H₄⟩—NH₂·HBr <br> p-ethylaniline hydrobromide | $(C_2H_5)_3COH$ <br> triethylcarbinol | C₂H₅—⟨C₆H₄⟩—NHC(C₂H₅)₃·HBr <br> N-triethylmethyl-p-ethylaniline hydrobromide |
| 5 | C₂H₅—⟨C₆H₃(CH₃)⟩—NH₂·HCl <br> p-ethyl-o-methylaniline hydrochloride | $(CH_3)_3COH$ <br> t-butyl alcohol | C₂H₅—⟨C₆H₃(CH₃)⟩—NHC(CH₃)₃·HCl <br> N-tertiary-butyl-p-ethyl-o-methylaniline hydrochloride |
| 6 | Cl—⟨C₆H₃(CH₃)⟩—NH₂·HI <br> p-chloro-o-methylaniline hydroiodide | $(CH_3)_3COH$ <br> t-butyl alcohol | Cl—⟨C₆H₃(CH₃)⟩—NHC(CH₃)₂·HI <br> N-tertiary-butyl-p-chloro-o-methylaniline hydroiodide |
| 7 | Cl—⟨C₆H₄⟩—NH₂·HCl <br> m-chloroaniline hydrochloride | $(CH_3)_3COH$ <br> t-butyl alcohol | Cl—⟨C₆H₄⟩—NHC(CH₃)₃·HCl <br> N-tertiary-butyl-m-chloroaniline hydrochloride |
| 8 | Cl—⟨C₆H₄⟩—NH₂·HCl <br> p-chloroaniline hydrochloride | $(CH_3)_3COH$ <br> t-butyl alcohol | Cl—⟨C₆H₄⟩—NHC(CH₃)₃·HCl <br> N-tertiary-butyl-p-chloroaniline hydrochloride |
| 9 | CH₃—⟨C₆H₄⟩—NH₂·HCl <br> m-toluidine hydrochloride | $(CH_3)_3COH$ <br> t-butyl alcohol | CH₃—⟨C₆H₄⟩—NHC(CH₃)₃·HCl <br> N-tertiary-butyl-m-toluidine hydrochloride |
| 10 | H₃C—⟨C₆H₄⟩—NH₂·HCl <br> p-toluidine hydrochloride | $(CH_3)_3COH$ <br> t-butyl alcohol | H₃C—⟨C₆H₄⟩—NHC(CH₃)₃·HCl <br> N-tertiary-butyl-p-toluidine hydrochloride |

EXAMPLE 11

This example is provided to illustrate the reduced corrosiveness of the reaction medium of the present invention when compared to that of the process of U.S. Patent No. 2,692,287.

Samples of 316 stainless steel were exposed for the same periods of time in the liquid reaction medium (in which tertiary butyl aniline was prepared by reacting, aniline hydrochloride and t-butyl alcohol) of both U.S. 2,692,287 and the present invention. The calculated corrosion rates for each medium are presented below:

316 stainless steel

| Reaction medium (liquid): | Calculated corrosion rate (inches per year) |
|---|---|
| U.S. 2,692,287 | 0.5 |
| Present invention | 0.16 |

EXAMPLE 12

Preemergence control

Selective preemergence control of monocotyledonous and dicotyledonous weeds in the presence of crops, such as corn, cotton, soybeans, peanuts, and snapbeans, can be achieved with the compounds prepared by the present invention. This is demonstrated by the following tests wherein seeds of the above-identified crops and a number of monocot and dicot weeds are thoroughly mixed with potting soil. Approximately one inch of each of the seed-soil mixtures was then placed on top of one inch of potting soil in separate pint containers and lightly tamped. These seeded containers were then sprayed with solutions of the test compounds prepared in either 50/50 acetone/water mixtures, or in water alone where the salts were applied, at concentrations calculated to deposit a predetermined amount of the test compound in each container. The amount of compound deposited in the various treatments is reported as rate per acre application. After spraying, the containers are placed on greenhouse benches and cared for in the usual manner. Two weeks after treatment the containers are examined, rated according to the Herbitoxicity Index given below, and the results are recorded. The results, reported in Table II below, demonstrate the high degree of selective preemergence activity of the compounds of the instant invention.

In Table II set forth hereinbelow, the values reported correspond to the values set forth in the herbitoxicity index set forth hereinbelow.

Herbitoxicity index

9=100% reduction in stand.
9—=1 or 2 stunted plants remaining.
8=85–<100% reduction in stand.
7=70–<85% reduction in stand.
6=60–<70% reduction in stand.
5=50–<60% reduction in stand.
4=40–<50% reduction in stand.
3=30–<40% reduction in stand.
2=20–<30% reduction in stand.
1=10–<20% reduction in stand.
0=No apparent effect.
s=Severe injury.
m=Moderate injury.
t=Trace to slight injury.
c=Chlorotic.
a=Abnormal, malformed, twisted.

TABLE II.—PREEMERGENCE

| Structure | Rate, lbs./acre | Jimsonweed | Kochia | Lambs-quarter | Mustard | Pigweed | Purslane | Barnyard grass |
|---|---|---|---|---|---|---|---|---|
| 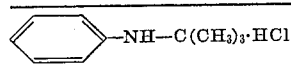 | 2 | 7m | 8m | 5m | 9— | 9— | 7s | 8s |
| 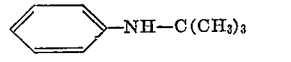 | 2 | 9— | 8m | 7m | 8sc | 9 | 7m | 7m |
| 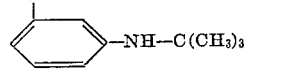 | 4 | | | 9— | 9—sc | 9— | | 9 |
|  | 2 | 8mc | 9 | 7m | 9— | 9 | 9 | 7sc |
| 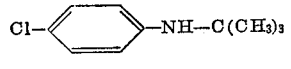 | 5 | | | 4 | 8s | 9— | | 9— |
|  | 2 | 2m | 7 | t | 8mc | 9— | 7m | 5tc |
| 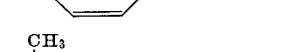 | 5 | | | 4 | 8m | 8 | | 9— |
|  | 2 | 2m | 7 | t | 7mc | 7 | 7 | 8mc |
| 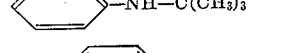 | 5 | | | 7 | 8 | 9 | | 6 |
|  | 4 | | | 8s | 8s | 9— | | 7m |
|  | 2 | 6mc | 8m | 5m | 8sc | 9 | 8 | 5t |
| 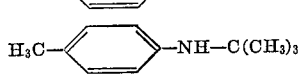 | 5 | | | 9— | 9— | 9 | | 3 |
|  | 4 | | | 9 | 9 | 9 | | 7 |
|  | 2 | 7mc | 6 | t | 8mc | 6 | 7 | 5 |
| 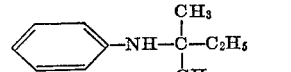 | 2 | 4tc | 5 | t | 7tc | 6 | 7 | 3 |
|  | 5 | | | 7s | 8s | 9 | | 8s |

TABLE II.—PREEMERGENCE—Continued

| Structure | Rate lbs./acre | Crabgrass | Giant Foxtail | Green Foxtail | Corn | Cotton | Soybean | Peanut | Snapbean |
|---|---|---|---|---|---|---|---|---|---|
| ⌬—NH—C(CH₃)₃·HCl | 2 | 7m | 7c | 8 | 0 | 0 | tc | 0 | tc |
| ⌬—NH—C(CH₃)₃ | 2 | 9— | 8sc | 8sc | 0 | 0 | 0 | 0 | tc |
| Cl (ortho)—⌬—NH—C(CH₃)₃ | 4 | 9 | ---- | 8sc | 0 | 0 | mc | 0 | tc |
|  | 2 | 9 | 8sc | 8sc | 0 | t | mc | 0 | tc |
| Cl—⌬—NH—C(CH₃)₃ | 5 | 9 | ---- | 9 | 0 | 0 | 0 | 0 | 0 |
|  | 2 | 8 | 6m | 8sc | 0 | 0 | 0 | 0 | tc |
| Cl—⌬—NH—C(CH₃)₃·HCl | 5 | 9 | ---- | 9 | 0 | 0 | 0 | 0 | 0 |
|  | 2 | 6t | 7m | 8sc | 0 | 0 | 0 | 0 | tc |
| CH₃ (ortho)—⌬—NH—C(CH₃)₃ | 5 | 9— | ---- | 7 | 0 | 0 | tc | 0 | ---- |
|  | 4 | 9— | ---- | 8sc | 0 | 0 | 0 | 0 | tc |
|  | 2 | 7 | 7 | 8 | 0 | 0 | 0 | 0 | tc |
| H₃C—⌬—NH—C(CH₃)₃ | 5 | 9— | ---- | 8 | 0 | 0 | 0 | 0 | 0 |
|  | 4 | 8s | ---- | 8s | 7 | 0 | 0 | 0 | 0 |
|  | 2 | 5 | 5 | 7 | 0 | 0 | 0 | 0 | 0 |
| H₃C—⌬—NH—C(CH₃)₃·HCl | 2 | 4 | 4 | 5 | 0 | 0 | 0 | 0 | 0 |
| ⌬—NH—C(CH₃)(C₂H₅)(CH₃) | 5 | 9 | ---- | 8s | 0 | 0 | tc | ---- | ---- |

While I have set forth certain specific embodiments and preferred modes of practice of our invention, this is solely for illustration, and it will be understood that various changes and modfications may be made in the invention.

What is claimed is:

1. In the process for preparing N-tertiary lower alkylated aniline compounds of the formula:

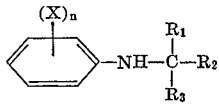

wherein X is selected from the group consisting of lower alkyl, bromo and chloro; $R_1$, $R_2$ and $R_3$ are each lower alkyl; and $n$ is an integer from 0 to 2, and hydrohalide acid salts thereof; by the acid catalyzed reaction of an aniline compound with a tri-lower alkyl carbinol, the improvement for preventing exessive decomposition of the reactant tri-lower alkyl carbinol, which comprises reacting one mole of an aniline acid salt of the formula:

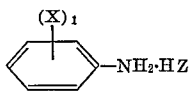

wherein X and $n$ are as above defined, and wherein HZ is a hydrohalogen acid, with 1 to 1.5 moles of a trialkylcarbinol of the formula:

wherein $R_1$, $R_2$, and $R_3$ are as above defined in the presence of at least about one mole of the aniline oil corresponding to said aniline acid salt at temperatures of 120–220° C.

2. The process of claim 1 wherein the reaction occurs at a pressure of about 100 p.s.i.g. or less.

3. The process of claim 2 wherein one mole of aniline hydrochloride is reacted with 1 to 1.5 moles of t-butyl alcohol in the presence of about 1 to about 4 moles of aniline at a temperature of about 150° C.

4. The process of claim 3 wherein the ratio of tertiary butyl alcohol to aniline is about 0.5–0.75 based on the total aniline.

5. The process of claim 2 wherein the reaction is carried out at pressures of about 50 to 100 p.s.i.g.

6. The process of claim 2 wherein said aniline acid salt reactant is formed in situ during the reaction from the corresponding aniline and strong acid compounds.

References Cited

UNITED STATES PATENTS 2,692,287   10/1954   Bell et al. _____ 260—577 X

CHARLES B. PARKER, Primary Examiner

RICHARD L. RAYMOND, Assistant Examiner

U.S. Cl. X.R.

71—121; 260—501.21